(12) United States Patent
Bryant

(10) Patent No.: US 8,713,263 B2
(45) Date of Patent: *Apr. 29, 2014

(54) OUT-OF-ORDER LOAD/STORE QUEUE STRUCTURE

(75) Inventor: Christopher D. Bryant, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 370 days.

This patent is subject to a terminal disclaimer.

(21) Appl. No.: 12/916,672

(22) Filed: Nov. 1, 2010

(65) Prior Publication Data

US 2012/0110280 A1    May 3, 2012

(51) Int. Cl.
*G06F 13/00* (2006.01)
(52) U.S. Cl.
USPC .......................................... 711/154; 711/119
(58) Field of Classification Search
USPC .................................................. 711/119, 154
See application file for complete search history.

(56) References Cited

U.S. PATENT DOCUMENTS

| | | | | |
|---|---|---|---|---|
| 5,781,199 A | * | 7/1998 | Oniki et al. | 345/505 |
| 5,887,134 A | * | 3/1999 | Ebrahim | 709/200 |
| 6,481,251 B1 | * | 11/2002 | Meier et al. | 70/52 |
| 2009/0024835 A1 | * | 1/2009 | Fertig et al. | 712/207 |
| 2009/0327665 A1 | * | 12/2009 | Sperber et al. | 712/222 |
| 2012/0084533 A1 | * | 4/2012 | Sperber et al. | 712/200 |

* cited by examiner

*Primary Examiner* — Reba I Elmore

(57) ABSTRACT

The present invention provides a method and apparatus for supporting embodiments of an out-of-order load/store queue structure. One embodiment of the apparatus includes a first queue for storing memory operations adapted to be executed out-of-order with respect to other memory operations. The apparatus also includes one or more additional queues for storing memory operation in response to completion of a memory operation. The embodiment of the apparatus is configured to remove the memory operation from the first queue in response to the completion.

27 Claims, 6 Drawing Sheets

OUT-OF-ORDER LOAD/STORE QUEUE STRUCTURE

BACKGROUND OF THE INVENTION

1. Field of the Invention

This invention relates generally to processor-based systems, and, more particularly, to an out-of-order load/store queue structure that may be implemented in processor-based systems.

2. Description of the Related Art

Processor-based systems utilize two basic memory access instructions or operations: a store that puts (or stores) information in a memory location such as a register and a load that reads information out of a memory location. High-performance out-of-order execution microprocessors can execute memory access instructions (loads and stores) out of program order. For example, a program code may include a series of memory access instructions including loads (L1, L2, ... ) and stores (S1, S2; ... ) that are to be executed in the order: S1, L1, S2, L2, .... However, the out-of-order processor may select the instructions in a different order such as L1, L2, S1, S2, .... Some instruction set architectures require strong ordering of memory operations (e.g. the x86 instruction set architecture). Generally, memory operations are strongly ordered if they appear to have occurred in the program order specified. When attempting to execute instructions out of order, the processor must respect true dependencies between instructions because executing loads and stores out of order can produce incorrect results if a dependent load/store pair was executed out of order. For example, if S1 stores data to the same physical address that L1 subsequently reads data from, the store S1 must be completed (or retired) before L1 is performed so that the correct data is stored at the physical address for the L1 to read.

Dependencies between instructions can also be violated when different instructions are performed by different processors and/or co-processors in systems that implement multiple processors and/or co-processors. For example, if a first processor performs a store to address A1 followed by a store to address A2 and a second processor performs a load from address A2 (which misses in the data cache of the second processor) followed by a load from address A1 (which hits in the data cache of the second processor), strong memory ordering rules may be violated. Strong memory ordering rules require, in the above example, that if the load from address A2 receives the store data from the store to address A2, then the load from address A1 must receive the store data from the store to address A1. However, if the load from address A1 is allowed to complete while the load from address A2 is being serviced, then the following scenario may occur: (1) the load from address A1 may receive data prior to the store to address A1; (2) the store to address A1 may complete; (3) the store to address A2 may complete; and (4) the load to address A2 may complete and receive the data provided by the store to address A2. This outcome would be incorrect because the load from address A1 occurred before the store to address A1. In other words, the load to address A1 will receive stale data.

Store and load instructions typically operate on memory locations in one or more caches associated with the processor. Values from store instructions are not committed to the memory system (e.g., the caches) immediately after execution of the store instruction. Instead, the store instructions, including the memory address and store data, are buffered in a store queue for a selected time interval. Buffering allows the stores to be written in correct program order even though they may have been executed in a different order. At the end of the waiting time, the store retires and the buffered data is written to the memory system. Buffering stores until retirement and completion of the write operation can avoid dependencies that cause an earlier load to receive an incorrect value from the memory system because a later store was allowed to execute before the earlier load. Load instructions, including the memory address and loaded data, can also be buffered in a load queue until the load instruction has completed.

Providing one queue for buffering stores and another queue for buffering loads may introduce a number of complications and inefficiencies. For example, store instructions are added to the store queue when they have been dispatched and then remain in the store queue until they complete (i.e., receive a valid address translation and data) and retire (i.e., write valid data back to the indicated address). However, processor-based systems typically implement a "lazy write" approach that allows the store instruction to be retired before the data is actually written into memory. The store instruction therefore thinks it is done even though it has not yet retired. Lazy writing provides the system with flexibility that can be used to improve performance in some cases. However, delaying writes for store instructions can cause the store queue to grow very large as it fills with stores, completed stores, and "retired" store entries that are waiting for their data to be written back into memory. Furthermore, other instructions in the out-of-order system may be stalled while the retired entries are waiting to have their data written back to memory. Similar problems can afflict the load queue.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, an apparatus is provided for supporting embodiments of an out-of-order load/store queue structure. One embodiment of the apparatus includes a first queue for storing memory operations adapted to be executed out-of-order with respect to other memory operations. The apparatus also includes one or more additional queues for storing memory operations in response to completion of the memory operation. The memory operation can be removed from the first queue in response to the completion.

In another embodiment, a method is provided for supporting embodiments of an out-of-order load/store queue structure. One embodiment of the method includes storing one or more memory operations in a first queue. The memory operations are adapted to be executed out-of-order with respect to other memory operations. The method also includes moving the memory operation from the first queue to one or more additional queues in response to completion of the memory operation.

In yet another embodiment, computer readable media is provided for supporting manufacturing processes used to form an out-of-order load/store queue structure. One embodiment of the computer readable media includes instructions that when executed can configure a manufacturing process used to manufacture a semiconductor device that includes a first queue for storing one or more memory operations adapted to be executed out-of-order with respect to other memory operations. The computer readable media also includes instructions that when executed can configure a manufacturing process used to manufacture the semiconductor device that includes one or more additional queues for storing memory operations in response to completion of the memory operation. The memory operation can be removed from the first queue in response to the completion.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
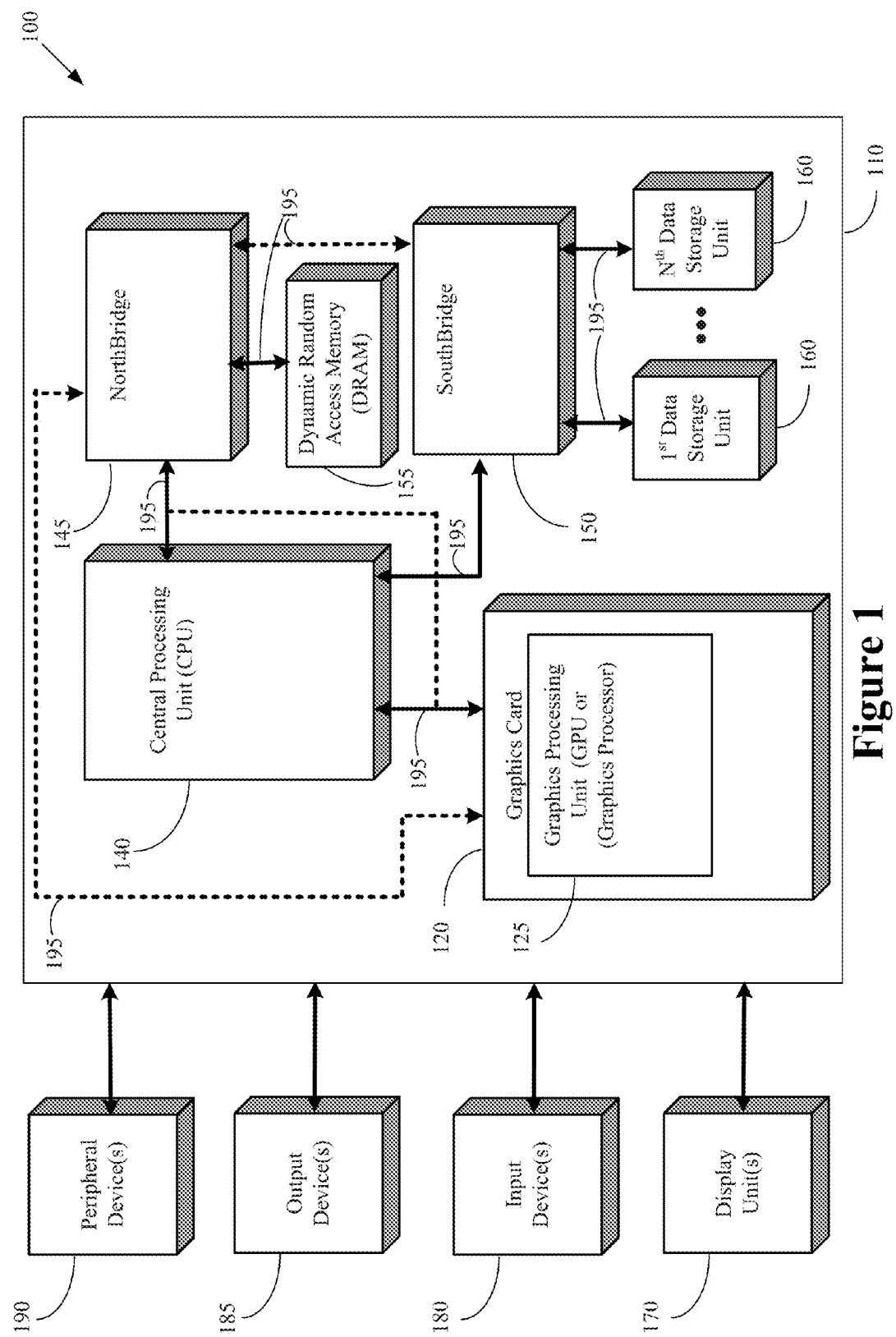
FIG. 1 conceptually illustrates one exemplary embodiment of a computer system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of a queue structure that can be implemented in a load/store unit to facilitate out-of-order processing of load and/or store instructions. Conventional in-order load/store units do not match the performance (e.g., speed, latency, etc.) levels of out-of-order load/store units. However, out-of-order load/store units consume relatively more power than in-order load/store units. Moreover, the performance of the out-of-order load/store units can be degraded due to "replay storms" in which instructions are unable to complete and must be replayed. The replayed instructions remain in the instruction queue where they may delay or block other instructions, leading to more replays, and potentially resulting in a "storm" of replays.

The present application may address some or all of these difficulties using a queue structure that includes a first queue for storing loads and/or stores for an out-of-order load/store unit. The queue structure also includes additional queues for storing the load and/or store operations when they have completed (but are not yet retired) or when the operations need to be replayed. In one illustrative embodiment, the out of order load store unit includes 8 queue structures: a memory ordering queue (MOQ), memory ordering queue entries (MOQE), a completed store queue (CSQ), a retired store queue (RSQ), a replay access queue (RAQ), a retired write combine queue (WCQ), a load ordering queue (LOQ) and a store ordering queue (OOB). Offloading entries from the memory ordering queue to other queues when the operations complete (or are to be replayed) frees up space in the memory ordering queue (MOQ) for additional instructions and may prevent the occurrence of replay storms since replayed entries are no longer stored in the MOQ. In one embodiment, some or all of these queues may be non-shifting, thereby saving on power.

FIG. 1 conceptually illustrates one exemplary embodiment of a computer system 100. In various embodiments, the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110 which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the computer system 100 runs an operating system such as Linux, Unix, Windows, Mac OS, or the like.

In the illustrated embodiment, the main structure 110 includes a graphics card 120. For example, the graphics card 120 may be an ATI Radeon™ graphics card from Advanced Micro Devices ("AMD"). The graphics card 120 may, in different embodiments, be connected on a Peripheral Component Interconnect (PCI) Bus (not shown), PCI-Express Bus (not shown), an Accelerated Graphics Port (AGP) Bus (also not shown), or other electronic and/or communicative connection. In one embodiment, the graphics card 120 may contain a graphics processing unit (GPU) 125 used in processing graphics data. In various embodiments the graphics card 120 may be referred to as a circuit board or a printed circuit board or a daughter card or the like.

The computer system 100 shown in FIG. 1 also includes a central processing unit (CPU) 140, which is electronically and/or communicatively coupled to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other electronic and/or communicative connection. For example, CPU 140, northbridge 145, GPU 125 may be included in a single package or as part of a single die or "chips". In certain embodiments, the northbridge 145 may be coupled to a system RAM (or DRAM) 155 and in other embodiments the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

The computer system 100 may be connected to one or more display units 170, input devices 180, output devices 185, and/or peripheral devices 190. In various alternative embodiments, these elements may be internal or external to the computer system 100, and may be wired or wirelessly connected. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier, or other output device. The peripheral devices 190 may be any other device that can be coupled to a computer. Exemplary peripheral devices 190 may include a CD/DVD drive capable of reading and/or writing to physical digital media, a USB device, Zip Drive, external floppy drive, external hard drive, phone and/or broadband modem, router/gateway, access point and/or the like.

Figure 2:
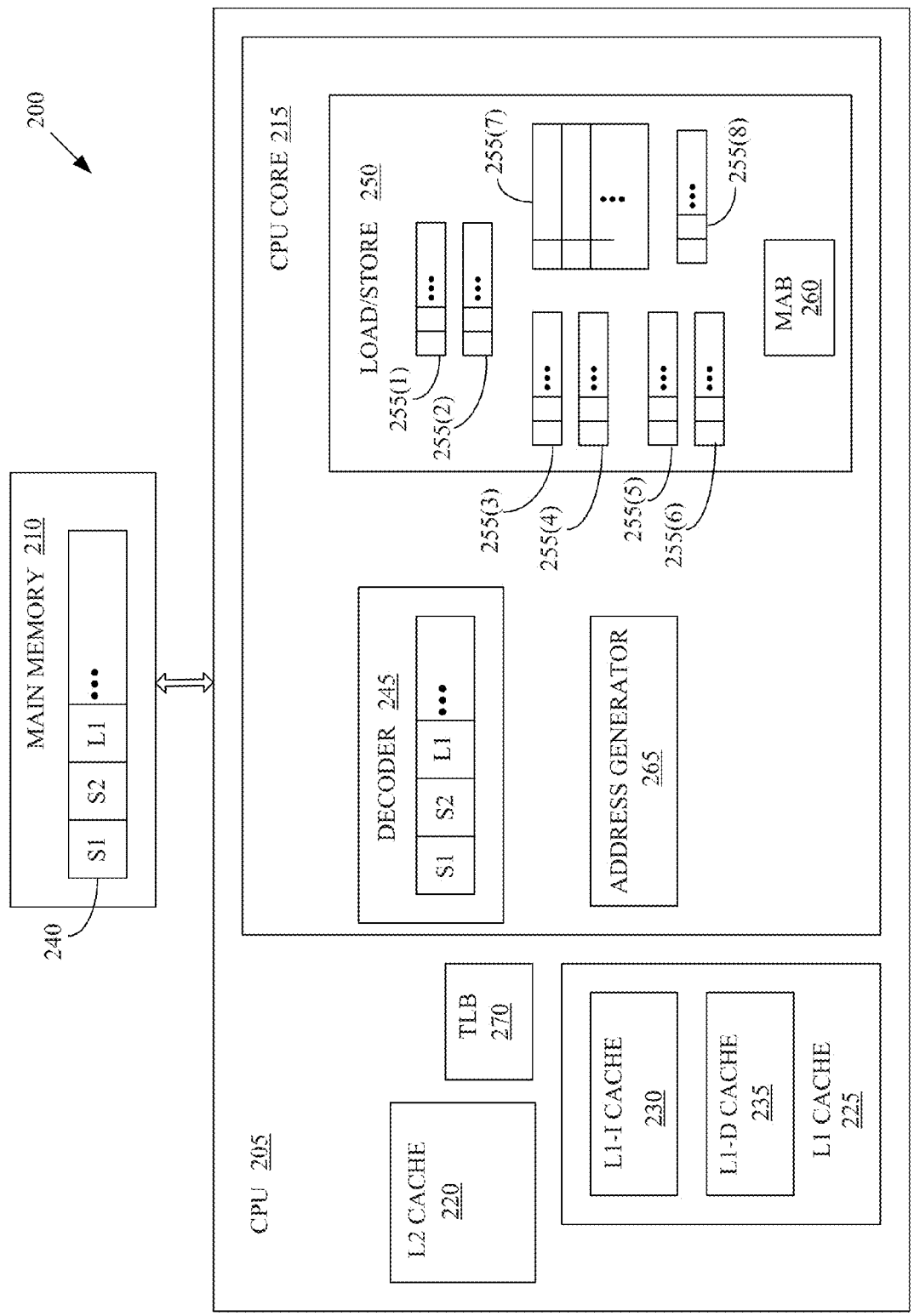
FIG. 2 conceptually illustrates a first exemplary embodiment of a semiconductor device that may be used in embodiments of the computer system shown in FIG. 1.

FIG. 2 conceptually illustrates a first exemplary embodiment of a semiconductor device 200 that may be formed in or on a semiconductor wafer (or die). The semiconductor device 200 may be formed in or on the semiconductor wafer using well known processes such as deposition, growth, photolithography, etching, planarising, polishing, annealing, and the like. In one embodiment, the semiconductor device 200 may be implemented in embodiments of the computer system 100 shown in FIG. 1. In the illustrated embodiment, the device 200 includes a central processing unit (CPU) 205 (such as the CPU 140 shown in FIG. 1) that is configured to access instructions and/or data that are stored in the main memory 210.

However, as will be appreciated by those of ordinary skill the art, the CPU 205 is intended to be illustrative and alternative embodiments may include other types of processor such as the graphics processing unit (GPU) 125 depicted in FIG. 1, a digital signal processor (DSP), an accelerated processing unit (APU), a co-processor, an applications processor, and the like. In the illustrated embodiment, the CPU 205 includes at least one CPU core 215 that is used to execute the instructions and/or manipulate the data. Alternatively, the processor-based system 200 may include multiple CPU cores 215 that work in concert with each other. The CPU 205 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 200 may implement different configurations of the CPU 205, such as configurations that use external caches.

The illustrated cache system includes a level 2 (L2) cache 220 for storing copies of instructions and/or data that are stored in the main memory 210. In the illustrated embodiment, the L2 cache 220 is 16-way associative to the main memory 210 so that each line in the main memory 210 can potentially be copied to and from 16 particular lines (which are conventionally referred to as "ways") in the L2 cache 220. However, persons of ordinary skill in the art having benefit of the present disclosure should appreciate that alternative embodiments of the main memory 210 and/or the L2 cache 220 can be implemented using any associativity. Relative to the main memory 210, the L2 cache 220 may be implemented using smaller and faster memory elements. The L2 cache 220 may also be deployed logically and/or physically closer to the CPU core 215 (relative to the main memory 210) so that information may be exchanged between the CPU core 215 and the L2 cache 220 more rapidly and/or with less latency.

The illustrated cache system also includes an L1 cache 225 for storing copies of instructions and/or data that are stored in the main memory 210 and/or the L2 cache 220. Relative to the L2 cache 220, the L1 cache 225 may be implemented using smaller and faster memory elements so that information stored in the lines of the L1 cache 225 can be retrieved quickly by the CPU 105. The L1 cache 225 may also be deployed logically and/or physically closer to the CPU core 215 (relative to the main memory 210 and the L2 cache 220) so that information may be exchanged between the CPU core 215 and the L1 cache 225 more rapidly and/or with less latency (relative to communication with the main memory 210 and the L2 cache 220). Persons of ordinary skill in the art having benefit of the present disclosure should appreciate that the L1 cache 225 and the L2 cache 220 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 225 is separated into level 1 (L1) caches for storing instructions and data, which are referred to as the L1-I cache 230 and the L1-D cache 235. Separating or partitioning the L1 cache 225 into an L1-I cache 230 for storing only instructions and an L1-D cache 235 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 230 are replaced with instructions from the L2 cache 220 and the lines in the L1-D cache 235 are replaced with data from the L2 cache 220. However, persons of ordinary skill in the art should appreciate that alternative embodiments of the L1 cache 225 may not be partitioned into separate instruction-only and data-only caches 230, 235. The caches 220, 225, 230, 235 can be flushed by writing back modified (or "dirty") cache lines to the main memory 210 and invalidating other lines in the caches 220, 225, 230, 235. Cache flushing may be required for some instructions performed by the CPU 205, such as a RESET or a write-back-invalidate (WBINVD) instruction.

Processor-based systems utilize two basic memory access instructions: a store that puts (or stores) information in a memory location such as a register and a load that reads information out of a memory location. The CPU core 215 can execute programs that are formed using instructions such as loads and stores. In the illustrated embodiment, programs are stored in the main memory 210 and the instructions are kept in program order, which indicates the logical order for execution of the instructions so that the program operates correctly. For example, the main memory 210 may store instructions for a program 140 that includes the stores S1, S2 and the load L1 in program order. Persons of ordinary skill in the art having benefit of the present disclosure should appreciate that the program 240 may also include other instructions that may be performed earlier or later in the program order of the program 240.

The illustrated embodiment of the CPU core 215 includes a decoder 245 that selects and decodes program instructions so that they can be executed by the CPU core 215. The decoder 245 can dispatch, send, or provide the decoded instructions to a load/store unit 250. In the illustrated embodiment, the CPU core 215 is an out-of-order processor that can execute instructions in an order that differs from the program order of the instructions in the associated program. For example, the decoder 245 may select and/or decode instructions from the program 140 and then the load/store unit 250 may pick the instructions in the order L1, S1, S2, which differs from the program order of the program 240 because the load L1 is picked before the stores S1, S2. In the illustrated embodiment, the load/store unit 250 implements a queue structure that includes a plurality of queues 255(1-8) that are configured to facilitate out-of-order processing of load and/or store instructions. In one exemplary embodiment, the queues 255 include a memory ordering queue (MOQ) 255(1), memory ordering queue entries (MOQE) 255(2), a completed store queue (CSQ) 255(3), a retired store queue (RSQ) 255(4), a replay access queue (RAQ) 255(5), a retired write combine queue (WCQ) 255(6), a load ordering queue (LOQ) 255(7), and a store ordering queue (00B) 255(8). The load/store unit 250 may also include a miss address buffer 260. The function and operation of the queues 255 and the miss address buffer 260 are discussed in further detail herein.

Load and/or store operations (or information indicative of and/or associated therewith) can be stored in entries in the queues 255. For example, the data location for each store may be indicated by a linear address, which may be translated into a physical address by an address generator 265 so that data can be accessed from the main memory 210 and/or one of the caches 220, 225, 230, 235. The CPU core 215 may therefore be electronically and/or communicatively coupled to a translation look aside buffer (TLB) 270 that holds information that is used to translate linear addresses into physical addresses. When a store (such as S1 or S2) is picked, the store checks the TLB 270 and/or the data caches 220, 225, 230, 235 for the data used by the store. The store may complete when it receives a valid address translation. Load data may also be indicated by linear addresses and so the address generator 265 may translate the linear addresses for load data into a physical address using information stored in the TLB 270. In the illustrated embodiment, when a load (such as L1) is picked, the load checks the TLB 270 and/or the data caches 220, 225, 230, 235 for the data used by the load.

In the illustrated embodiment, each of the queues 255 provides different functionality and performs a different role within the load/store unit 250. The queues 255 may therefore be implemented using different types of queue functionality, different structures, and/or different interconnections with other queues 255 and/or other functional blocks or entities. In one exemplary embodiment, the MOQ 255(1), the MOQ-E 255(2), the CSQ 255(3), the RSQ 255(4), the RAQ 255(5), the WCQ 255(6), the LOQ 255(7), and the OOB 255(8) may be implemented and operate in the following manner.

The exemplary embodiment of the MOQ 255(1) includes entries that are allocated at dispatch time. For example, up to two entries can be allocated in the same cycle. Entries in the MOQ 255(1) may be allocated from a free list of queue entries. Entries go back on the free list at completion time. For example, entries that held loads are returned to the free list when the load returns data and entries that held stores return to the free list when the store has a valid translation, e.g. from the TLB 270. The MOQ 255(1) may be responsible for sending completion status information and/or signaling back to the code coalescing unit (CCU) for loads. In one embodiment the CCU may send tags early in the physical register file (PRF) stage such that the correct MOQ entry is picked to access the data cache such as the caches 220, 225, 230, 235. Upon load completion, the MOQ 255(1) may copy or move entries to the OOB 255(8) or the LOQ 255(7), as discussed herein. Upon store completion, the MOQ 255(1) may copy or move entries to the CSQ 255(3), as discussed herein. The information in the entry may be copied to the OOB 255(8) if the load that completed was out of order with respect to other older stores in the pipe line. The information in the entry may be copied to the LOQ 255(7) if the load was completed out of order with respect to other older non-completed loads in the pipeline. Upon a cache miss, or a non-cacheable access, the MOQ 255(1) may hold loads that cannot be serviced without the use of the miss address buffer (MAB) 260. Stores that have a valid translation (e.g., from the TLB 270) may be sent to the CSQ 255(3).

Entries in the exemplary embodiment of the MOQE 255(2) may also be allocated at dispatch time. For example, up to two entries can be allocated in the same cycle. At dispatch time the MOQE 255(2) may store the MOQ entry number that is being taken from the MOQ free list. When two operations are dispatched at the same time, the older operation may be assumed to be on the 0-th port and the younger on the 1st port. In the illustrated embodiment, the MOQE 255(2) is a shifting queue that holds the oldest operation in the load/store unit in MOQE entry 0 and the youngest entry in MOQE entry 0+n, where n is the number of outstanding transactions in the load store queue. The MOQE 255(2) can "squish" entries to reclaim holes when transactions complete out of order by shifting younger entries into spaces in the MOQE 255(2) that are vacated when the out-of-order instructions complete. A valid generated address (VGA) for the instruction or operation may also be held in the MOQE 255(2) for ordering considerations. The MOQE 255(2) may allow and/or support a searching the MOQ 255(1) to determine if the current access that completed was out of order. Using the MOQE 255(2) for any searches may significantly increase the speed of the searches relative to searching queues that can include completed and/or retired entries.

The exemplary embodiment of the CSQ 255(3) receives and holds entries for completed store operations. Entries may be allocated to the exemplary embodiment of the CSQ 255(3) when stores receive a linear address from the address generation unit 265 and are picked by the MOQ 255(1). For example, entries for normal cacheable and TLB non-cacheable stores may be allocated when the store receives a valid translation. Stores that hit in the TLB 270 and pass protection checks can signal completion onto the store result bus and then wait for retirement in the CSQ 255(3). Stores that miss the TLB 270 do not signal completion onto the store result bus, and will "sleep" in the MOQ 255(1) until the table walk is complete.

The exemplary embodiment of the RSQ 255(4) receives and holds entries for retired store operations. For example, up to two entries can be allocated at retirement time to move entries for stores from the CSQ 255(3) to the RSQ 255(4). Entries may be allocated to the exemplary embodiment of the RSQ 255(4) when a store is retired. In the illustrated embodiment, the RSQ 255(4) uses a simple head and tail pointer. The tail points to the next entry to receive CSQ information and the head points the next store entry that can write data from the queue entry to the data cache.

Entries are allocated to the exemplary embodiment of the RAQ 255(5) when a MOQ entry becomes re-playable. For example, entries may be allocated to the RAQ 255(3) when a MOQ entry sets its replay ready bit and the MOQE 255(2) finds that this entry is the first MOQ entry that is ready. The RAQ 255(5) may implement a tail pointer to allocate entries and entries may be allocated at the location indicated by the tail pointer until the RAQ 255(5) is full. When the RAQ 255(5) is full, no new entries may be allocated, even though MOQ entries may be signaling replay ready. These MOQ entries that are re-playable may or may not have accessed the data cache complex (e.g., the TLB 270, tag array, or data cache to 20, 225, 230, 235).

The exemplary embodiment of the WCQ 255(6) may be used to hold entries for streaming stores and/or write combining store operations. For example, up to two entries can be allocated at retirement time to move entries for streaming stores and/or write combining store operations from the CSQ 255(3) to the WCQ 255(5). In one embodiment, a tail pointer can be used to indicate the entry in the WCQ 255(5) that can be used to hold information associated with a store. The tail pointer can also be used to indicate when all the entries in the WCQ 255(5) have been allocated. A head pointer can be used to determine which entry is to be sent from the WCQ 255(5) to a bus unit (BU) or bus interface unit (BIU) for combining. The WCQ 255(5) may be designed to send streaming stores or write combine stores to the BU. This process may be faster than the conventional approach because it may bypass the need for MAB allocation and avoid conflicts with load misses or store misses that also want MAB entries.

Entries may be allocated to the LOQ 255(6) to store information associated with load operations. In one embodiment, entries may be allocated to the LOQ 255(6) for loads that complete speculatively while there are older loads that have not sent their completion status, e.g., while older load entries remain in the MOQ 255(1), as may be indicated by information in the MOQE 255(2). The LOQ 255(7) may hold information associated with loads that have probed the data cache 220, 225, 230, 235 and returned their status while an outstanding older load that has not sent completion status remains in the MOQ 255(1). The LOQ 255(7) may be configured to protect against load-to-load ordering problems that result from snoops. Snooping is a well-known process that allows individual caches to monitor address lines on a bus for accesses to memory locations that they have cached. When a write operation is observed to a location that a cache has a copy of the cached memory location, the cache controller may invalidate its copy of the snooped memory location.

Entries may be allocated to the OOB 255(8) to store information associated with load operations. In one embodiment, entries may be allocated to the OOB 255(8) when a valid load request is sent to the caches 220, 225, 230, 235 while older stores (or load-op-stores) have not yet received valid addresses. Upon allocation, a snap shot of the older stores (relative to the load that has been allocated the entry) is taken and saved in the allocated entry of the OOB 255(8). A load tag and a load address for the load that has been allocated the entry may also be saved in the OOB 255(8). In one embodiment, executing stores can then search the OOB 255(8) for loads that have completed out-of-order with respect to the executing store. The executing store can perform the search instead of searching the MOQ 255(1). Embodiments of the OOB 255(8) can be implemented using a smaller queue than the MOQ 255(1), which can reduce the search times.

Figure 3:
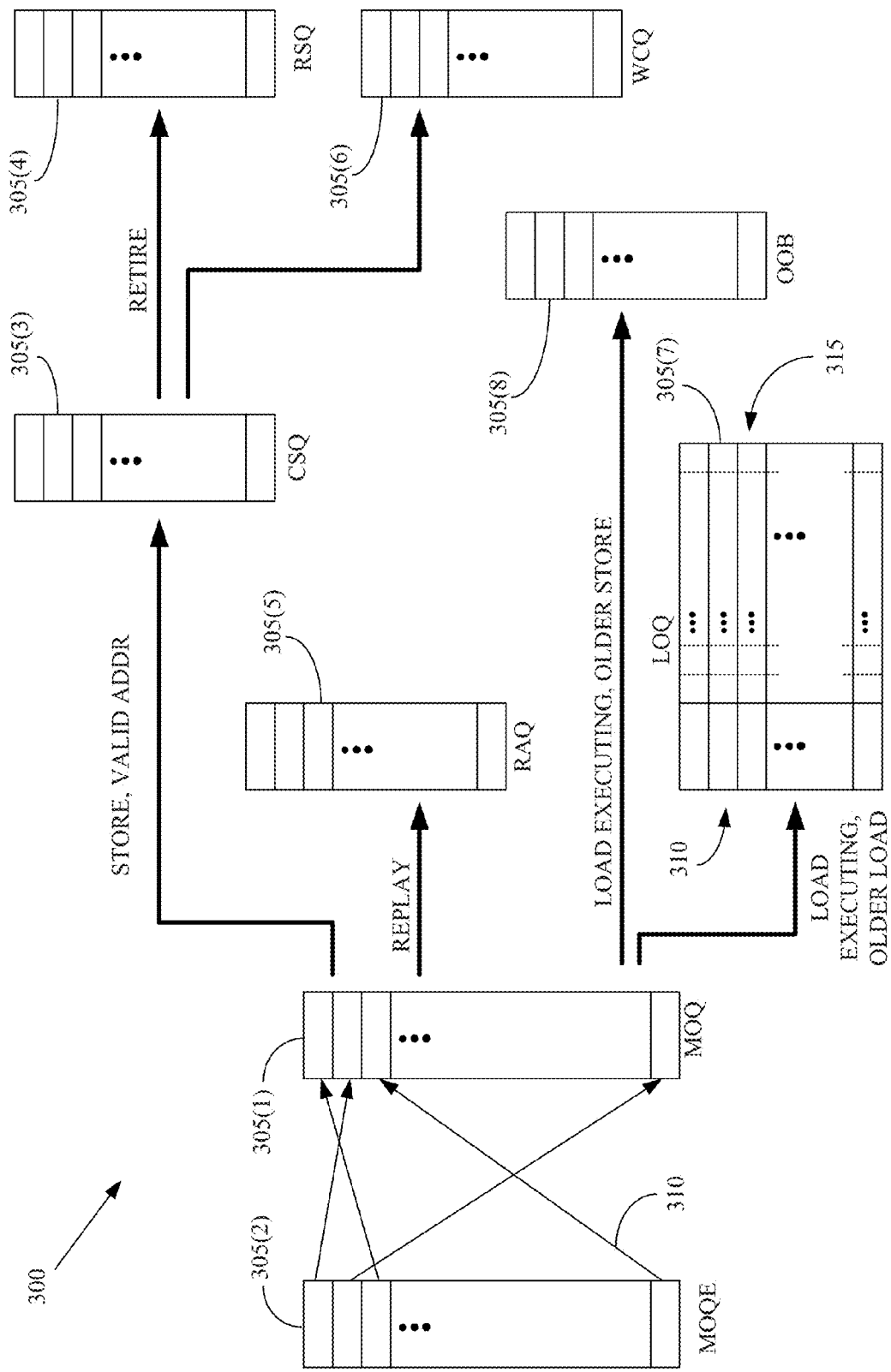
FIG. 3 conceptually illustrates one exemplary embodiment of a queue structure that may be used in embodiments of the semiconductor device shown in FIG. 2.

FIG. 3 conceptually illustrates one exemplary embodiment of a queue structure 300. In the illustrated embodiment, the queue structure 300 includes a MOQ 305(1) that includes entries for holding load operations and/or store operations following dispatch and before completion. The queue structure 300 also includes a MOQE 305(2) made up of entries including pointers 310 (only one indicated by a distinguishing numeral in FIG. 3) from the entries of the MOQE 305(2) to corresponding entries in the MOQ 305(1). The order of the entries in the MOQE 305(2) corresponds to the program order of the load and/or store operation associated with the entry. For example, the oldest operation may be associated with an entry at the head of the MOQE 305(2) and the youngest operation may be associated with an entry at the tail of the MOQE 305(2). Entries for out-of-order instructions/operations can therefore be allocated from a free list to the MOQ 305(1) and the MOQE 305(2) can be searched to quickly determine the program order of these instructions/operations.

Entries for store operations can be moved (e.g., the information can be copied to another location and deleted from the current location) from the MOQ 305(1) to an entry in the CSQ 305(3). In one embodiment, store entries are moved from the MOQ 305(1) to the CSQ 305(3) in response to the store operation completing. For example, a store operation can complete when it receives a valid address translation from a translation look aside buffer or other entity. An entry in the CSQ 305(3) may be allocated to the completed store operation, which may then wait in the CSQ 305(3) until the store operation retires. Once the entry corresponding to the store operation has been moved, the entry in the MOQ 305(1) can be de-allocated and returned to the free list so that it can be allocated to another operation or instruction.

Upon retirement, the store operation can be moved to the RSQ 305(4) where it can wait until the data associated with the store operation is written back to memory. For example, in systems that implement lazy writes, the system has the flexibility to write the data back to memory at any time following retirement. Thus, although the store may think that it is done, the actual writing of the data back to memory may not yet have been performed. Moving retired store entries to the RSQ 305(4) while they await writing back of the data to the memory can prevent stalls of other instructions/operations in other parts of the queue structure 300 that may have occurred if these instructions/operations were waiting for the retired store entries in the MOQ 305(1) to write their data. Alternatively, streaming stores or write-combine stores can be written to the WCQ 305(6) when the stores retire. The streaming or write-combine stores may wait in the WCQ 305(6) until they can be written onto a bus using a bus interface unit. Once the data has been written back (or written onto the bus in the case of streaming or write-combine stores), the entry for the store operation in the RSQ 305(4) or WCQ 305(6) can be de-allocated so that it may be used for other store operations.

Some operations in entries of the MOQ 305(1) may need to be replayed. For example, a load operation may be picked for execution but may miss the translation look aside buffer. Consequently, the load operation may not receive a valid address translation and may therefore need to be replayed. For another example, a store operation may not receive an address from the address generation unit and may therefore need to be replayed. Instructions that are waiting to be replayed can then be moved from the MOQ 305(1) to the RAQ 305(5) until they can be replayed. In one embodiment, instructions in the RAQ 305(5) may be replayed whenever possible, e.g., when a load port or a store port becomes available. In other embodiments, other criteria for determining the order for replaying instructions from the RAQ 305(5) may be used to pick instructions for replay.

Entries for loads that complete speculatively may be moved from the MOQ 305(1) to the LOQ 305(7) if they are out-of-order with respect to other older loads. In the illustrated embodiment, the entries in the LOQ 305(7) include (among other information) the address 310 of the load that has completed speculatively and a series (or field) of load bits 315 that are used to indicate older loads that have not yet completed. For example, the load bits 315 may indicate a mapping of loads that are older than the current load. In one embodiment, n bits 315 may be used, where n represents the depth of the MOQ 305(1). When an out-of-order load is stored in the LOQ 305(7), the LOQ 305(7) searches the MOQE 305(2) to determine which loads are older than the current load. For example, suppose that the MOQ 305(1) is a 12-deep queue and there are three loads (L1, L2, L3) currently in the MOQ 305(1). Next, suppose that L3's address is generated first and is therefore executing out-of-order. As a result, L3 is stored in the LOQ 305(7) and the LOQ 305(7) searches the MOQE 305(2) for older loads. For example, when the L3 is executed a scan can be performed downward through the MOQE 305 (2) towards 0-th entry of MOQE 305(2) to find the older loads. Since entries in the MOQ 305(1) and MOQE 305(2) for loads are de-allocated upon completion, loads that are in the MOQE 305(2) are also in the MOQ 305(2). Scanning "downward" therefore allows the older loads to be found quickly. The downward scan may also find older stores and older stores with no valid address can be detected. In this case, it will be determined that L1 and L2 are older loads. As a result, bits 0 and 1 may be set and bits 2 through 11 may not be set. When an older load completes, the bit corresponding to that older load is cleared. Once all the bits 315 are cleared, the associated load may be removed from the LOQ 305(7). For instance, continuing with the example above, suppose L2 executes next. In this case, because L2 has completed out-of-order with respect to L1, L2 is now also stored in the LOQ 305(7) (with bit 0 of L2's field 315 set). However, because L2 has executed, bit 1 of L3's field 315 may be cleared. Eventually, L1 completes and, as a result, bit 0 of L2 and L3's field 315 are cleared and L2 and L3 are removed from the LOQ 305(7). It is noted that L1 may not be stored in the LOQ 305(7) in this example because there are no loads older than it in the MOQ 305(1).

Entries for loads that complete speculatively may also be moved to the OOB 305(8) when they are out-of-order with respect to one or more store instructions. As discussed herein, entries in the OOB 305(8) may include the load address for the completed load and information indicating the older stores (relative to the load that has been allocated the entry) that are pending when the load completes. The OOB 305(8) may be checked to determine if the load has bypassed an older store. Stores may also access the OOB 305(8) to check load addresses to see whether there are any younger loads that have completed.

Figure 4:
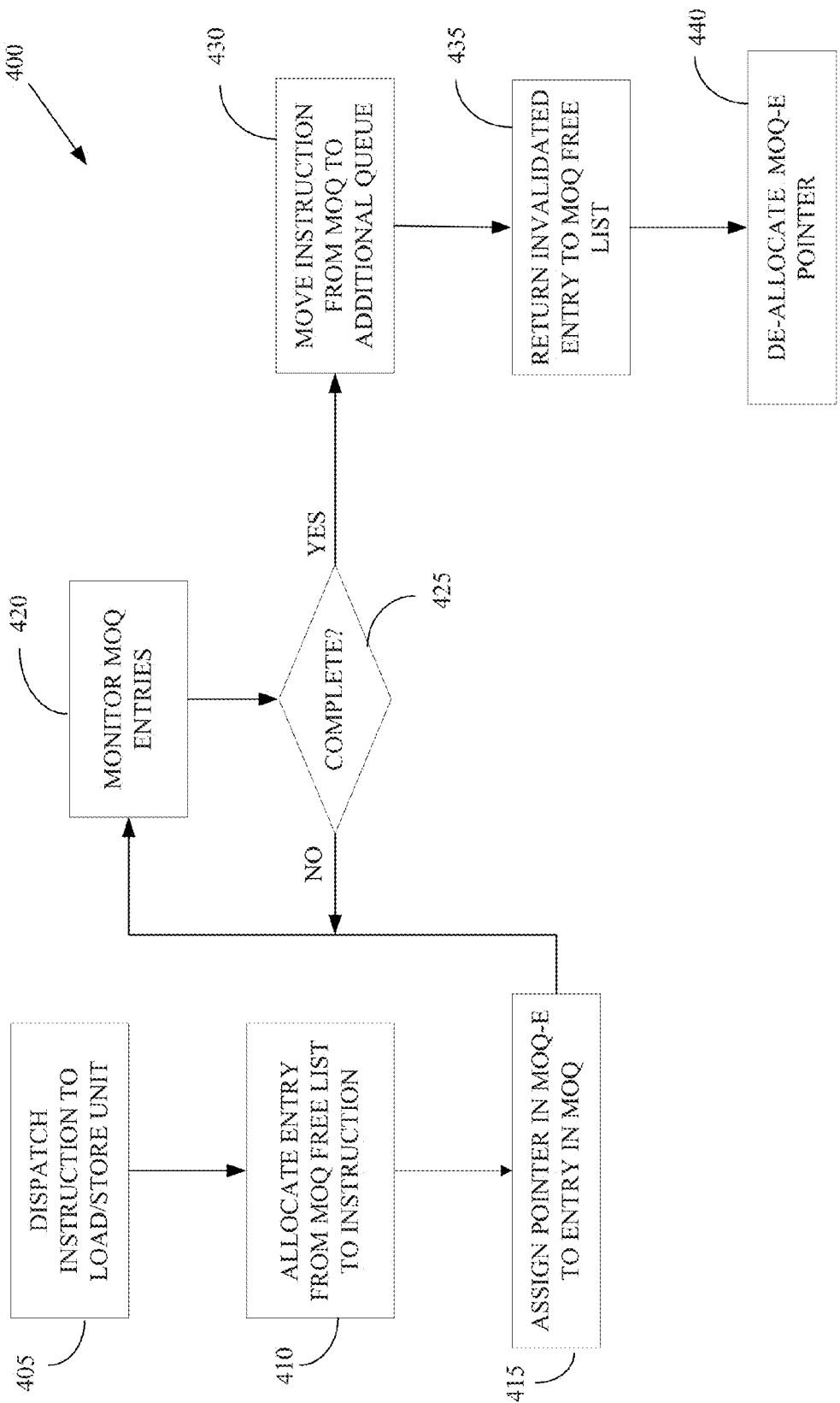
FIG. 4 conceptually illustrates a first exemplary embodiment of a method of operating a memory ordering queue such as may be implemented in embodiments of the queue structure shown in FIG. 3.

FIG. 4 conceptually illustrates a first exemplary embodiment of a method 400 of operating a memory ordering queue (MOQ) such as may be implemented in embodiments of the queue structure 300 shown in FIG. 3. In the illustrated embodiment, instructions are dispatched (at 405) to a load/store unit that implements a queue structure including a MOQ that is configured to handle out-of-order instructions. If available, an entry in the free list of the MOQ may be allocated (at 410) to the dispatched instruction. This entry is then removed from the free list. An entry in a MOQE implemented in the queue structure can then be allocated (at 415) and a pointer in the entry can be pointed to the new entry in the MOQ. The MOQE is an ordered queue and the ordering of the queue reflects the program order of the dispatched instructions. The pointers in the MOQE can therefore be used to determine the program order of entries in the MOQ, even though the entries in the MOQ are not ordered because entries may complete and be removed from the MOQ in any order.

Entries in the MOQ can be monitored (at 420) to determine whether any of the entries have completed (at 425). The entry for a completed instruction can be moved (at 430) from the MOQ to another queue when the entry completes (at 425), as discussed herein. The entry in the MOQ that was allocated to the instruction that has completed and been moved (at 430) may then be invalidated and returned (at 435) to the MOQ free list so that it becomes available for allocation to another dispatched instruction. The corresponding entry/pointer in the MOQE may also be de-allocated (at 440). The de-allocated entry can be used for another dispatched instruction (if it is at the tail of the MOQE) or "squished" so that it is reclaimed by a younger dispatched instruction that is already in the MOQE.

Figure 5:
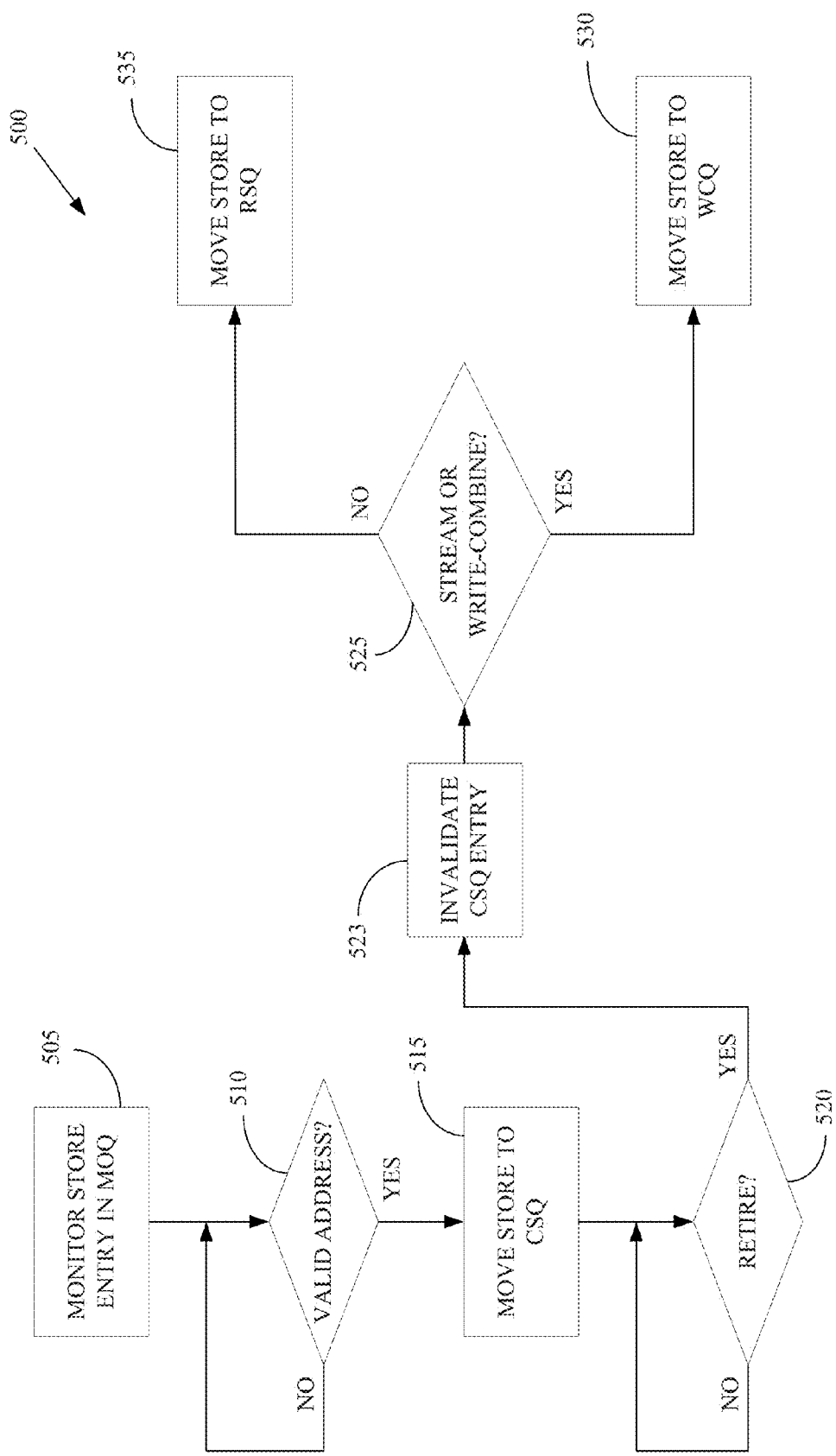
FIG. 5 conceptually illustrates a second exemplary embodiment of a method of operating a memory ordering queue such as may be implemented in embodiments of the queue structure shown in FIG. 3.

FIG. 5 conceptually illustrates a second exemplary embodiment of a method 500 of operating a MOQ such as may be implemented in embodiments of the queue structure 300 shown in FIG. 3. In the illustrated embodiment, the MOQ includes at least one entry for a dispatched store operation. The MOQ may therefore be monitored (at 505) to determine whether stores in the MOQ have completed. For example, as long as none of the stores in the MOQ have completed by receiving (at 510) a valid address or valid address translation, monitoring (at 505) of the MOQ continues. When one of the store entries in the MOQ completes by receiving (at 510) a valid address/translation, the store can be moved (at 515) from the MOQ to the CSQ, as discussed herein. The store then waits in the CSQ until it retires (at 520). Retired stores are invalidated (at 523) and if the retired store is determined (at 525) to be a streaming store or write-combine store, the retired store is moved (at 530) to the WCQ, as discussed herein. If the retired store is not a streaming store or a write-combine store, the retired store may be moved (at 535) to the RSQ, as discussed herein.

Figure 6:
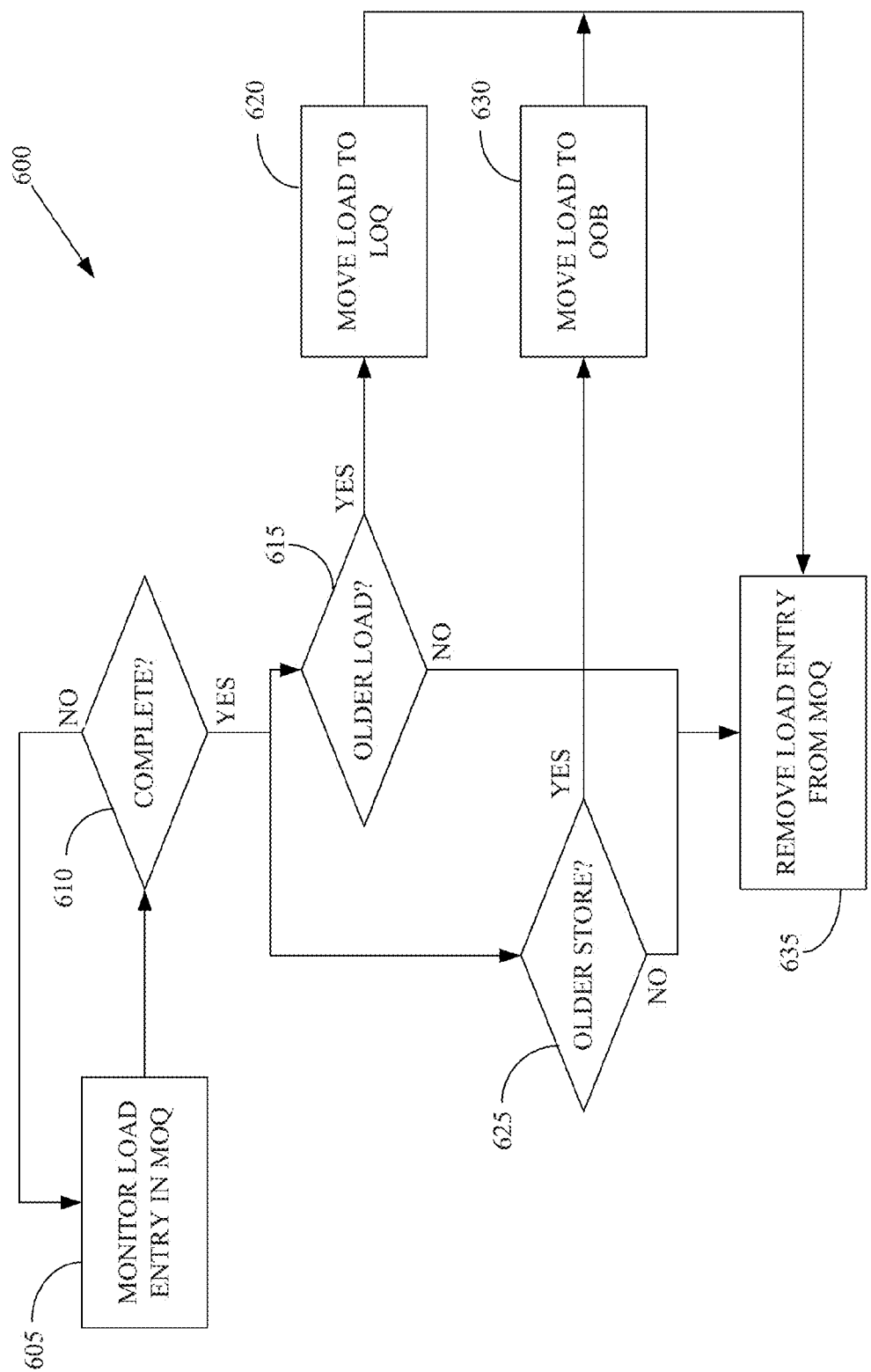
FIG. 6 conceptually illustrates a third exemplary embodiment of a method of operating a memory ordering queue such as may be implemented in embodiments of the queue structure shown in FIG. 3.

FIG. 6 conceptually illustrates a third exemplary embodiment of a method 600 of operating a MOQ such as may be implemented in embodiments of the queue structure 300 shown in FIG. 3. In the illustrated embodiment, the MOQ includes at least one entry for a dispatched load operation. The MOQ may therefore be monitored (at 605) to determine whether loads in the MOQ have completed. For example, as long as none of the loads in the MOQ have completed by receiving (at 610) a valid address or valid address translation, monitoring (at 605) of the MOQ continues. When one of the load entries in the MOQ completes (at 610), the system determines (at 615) whether there are any older loads pending. If so, entry information for the load can be moved (at 620) to the LOQ, as discussed herein. The system may also determine (at 625) whether or not there are any older stores pending in the current load completes (at 610). If so, entry information for the load can be moved (at 630) to the OOB, as discussed herein. Checking (at 615, 625) for older loads and/or older stores can be performed concurrently, in parallel, in series, or any other order. In some embodiments, a completed load may have concurrent entries in both the LOQ and the OOB, depending on the completion order of operations in a particular program. The entry for the completed load can then be removed (at 635) from the MOQ.

Embodiments of processor systems that implement a load/store unit that implements the queue structure as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
   a first queue for storing at least one memory operation adapted to be executed out-of-order with respect to other memory operations;
   a second queue for storing information indicating a program order of said at least one memory operation, wherein the second queue is configured to be searched to determine if said at least one memory operation completed out of order with respect to at least one of the other memory operations; and
   at least one additional queue for storing said at least one memory operation in response to completion of said at least one memory operation, wherein the apparatus is configured to remove said at least one memory operation from the first queue in response to said completion.

2. The apparatus of claim 1, wherein entries in the second queue each comprise a pointer that points to an entry in the first queue, and wherein the order of the entries in the second queue indicates the program order of the memory operations in the first queue.

3. The apparatus of claim 1, wherein at least one entry in the first queue is allocated to said at least one memory operation from a free list when said at least one memory operation is dispatched, and wherein said at least one entry in the first queue is returned to the free list in response to said completion of said at least one memory operation.

4. The apparatus of claim 1, wherein said at least one additional queue comprises an eighth queue configured to store said at least one memory operation when said at least one memory operation is awaiting replay.

5. The apparatus of claim 1, wherein the first queue is configured to hold at least one load operation when said at least one load operation cannot be serviced without the use of a miss address buffer.

6. The apparatus of claim 1, wherein said at least one additional queue comprises a third queue for storing at least one load operation when said at least one load operation completes out of order with respect to at least one other store operation.

7. The apparatus of claim 6, wherein the third queue is configured so that executing store operations can search the third queue for information indicating completed load operations that are later in program order than the executing store operations.

8. The apparatus of claim 1, wherein said at least one additional queue comprises a fourth queue for storing at least one load operation when said at least one load operation completes out of order with respect to at least one other load operation.

9. The apparatus of claim 8, wherein the fourth queue is configured to store said at least one load operation when said at least one load operation has probed a data cache and returned a completion status but said at least one other load operation is an older load that has not returned a completion status.

10. The apparatus of claim 1, wherein said at least one additional queue comprises a fifth queue for storing at least one store operation in response to an indication that that said at least one store operation has completed by receiving a valid address translation.

11. The apparatus of claim 10, wherein said at least one additional queue comprises a sixth queue for storing said at least one store operation from the fifth queue in response to retirement of said at least one store operation, and wherein said at least one store operation is deleted from the fifth queue in response to retirement of said at least one store operation.

12. The apparatus of claim 11, wherein the sixth queue is configured so that a store operation in an entry at a head of the sixth queue is the next store operation to write out data.

13. The apparatus of claim 10, wherein said at least one additional queue comprises a seventh queue for storing said at least one store operation received from the fifth queue when said at least one store operation is at least one of a streaming store operation or a write combining store operation.

14. The apparatus of claim 13, wherein the seventh queue is configured to provide said at least one streaming store operation or write combining store operation to a bus interface unit, bypassing a miss address buffer.

15. An apparatus, comprising:
 means for storing at least one memory operation adapted to be executed out-of-order with respect to other memory operations;
 means for storing information indicating a program order of said at least one memory operation, wherein the means for storing information is configured to be searched to determine if said at least one memory operation completed out of order with respect to at least one of the other memory operations; and
 means for storing said at least one memory operation in response to completion of said at least one memory operation, wherein the apparatus is configured to remove said at least one memory operation from the means for storing at least one memory operation in response to said completion.

16. A method, comprising:
 storing at least one memory operation in a first queue, wherein said at least one memory operation is adapted to be executed out-of-order with respect to other memory operations;
 storing information indicating a program order of said at least one memory operation in a second queue, wherein the second queue is configured to be searched to determine if said at least one memory operation completed out of order with respect to at least one of the other memory operations; and
 moving said at least one memory operation from the first queue to at least one additional queue in response to completion of said at least one memory operation.

17. The method of claim 16, comprising searching the second queue to determine if said at least one memory operation completed out of order with respect to at least one of the other memory operations.

18. The method of claim 16, comprising allocating at least one entry in the first queue to said at least one memory operation from a free list when said at least one memory operation is dispatched; and returning said at least one entry in the first queue to the free list in response to said completion of said at least one memory operation.

19. The method of claim 16, comprising moving at least one load operation from the first queue to a third queue when said at least one load operation completes out of order with respect to at least one other store operation.

20. The method of claim 16, comprising moving at least one load operation from the first queue to a fourth queue when said at least one load operation completes out of order with respect to at least one other load operation.

21. The method of claim 16, comprising moving said at least one memory operation to an eighth queue when said at least one memory operation is awaiting reply.

22. The method of claim 16, comprising moving at least one store operation from the first queue to a fifth queue in response to an indication that said at least one store operation has completed by receiving a valid address translation.

23. The method of claim 22, comprising moving said at least one store operation from the fifth queue to a sixth queue in response to retirement of said at least one store operation.

24. The method of claim 23, comprises moving, in response to retirement of said at least one store operation, said at least one store operation from the fifth queue to a seventh queue when said at least one store operation is at least one of a streaming store operation or a write combining store operation.

25. A non-transitory computer readable media storing instructions that when executed configures a manufacturing process used to manufacture a semiconductor device comprising:
 a first queue for storing at least one memory operation adapted to be executed out-of-order with respect to other memory operations;
 a second queue for storing information indicating a program order of said at least one memory operation, wherein the second queue is configured to be searched to determine if said at least one memory operation completed out of order with respect to at least one of the other memory operations; and
 at least one additional queue for storing said at least one other memory operation in response to completion of said at least one memory operation, wherein the semiconductor device is configured to remove said at least one memory operation from the first queue in response to said completion.

26. The non-transitory computer readable media set forth in claim 25, wherein the computer readable media is configured to store at least one of hardware description language instructions or an intermediate representation of the first queue and said at least one additional queue.

27. The non-transitory computer readable media set forth in claim 26, wherein the instructions when executed configure generation of lithography masks used to manufacture the first queue and said at least one additional queue.

* * * * *